HENRY H. PHILLIPS.

Improvement in Curtain-Fixtures.

No. 4,901. Reissued May 14, 1872.

WITNESSES.

J. E. Upham.

D. D. Kane

INVENTOR.

H. H. Phillips,

Chipman Hosmer & Co,

Attys,

AM. PHOTO-LITHOGRAPHIC CO. N.Y. (OSBORNE'S PROCESS.)

UNITED STATES PATENT OFFICE.

HENRY H. PHILLIPS, OF BUFFALO, NEW YORK.

IMPROVEMENT IN CURTAIN-FIXTURES.

Specification forming part of Letters Patent No. 124,154, dated February 27, 1872; reissue No. 4,901, dated May 14, 1872.

*To all whom it may concern:*

Be it known that I, HENRY H. PHILLIPS, of Buffalo, in the county of Erie and State of New York, have invented a new and valuable Improvement in Curtain-Fixtures; and I do hereby declare that the following is a full, clear, and exact description of the construction and operation of the same, reference being had to the annexed drawing making a part of this specification, and to the figures and letters of reference marked thereon.

Figure 1:
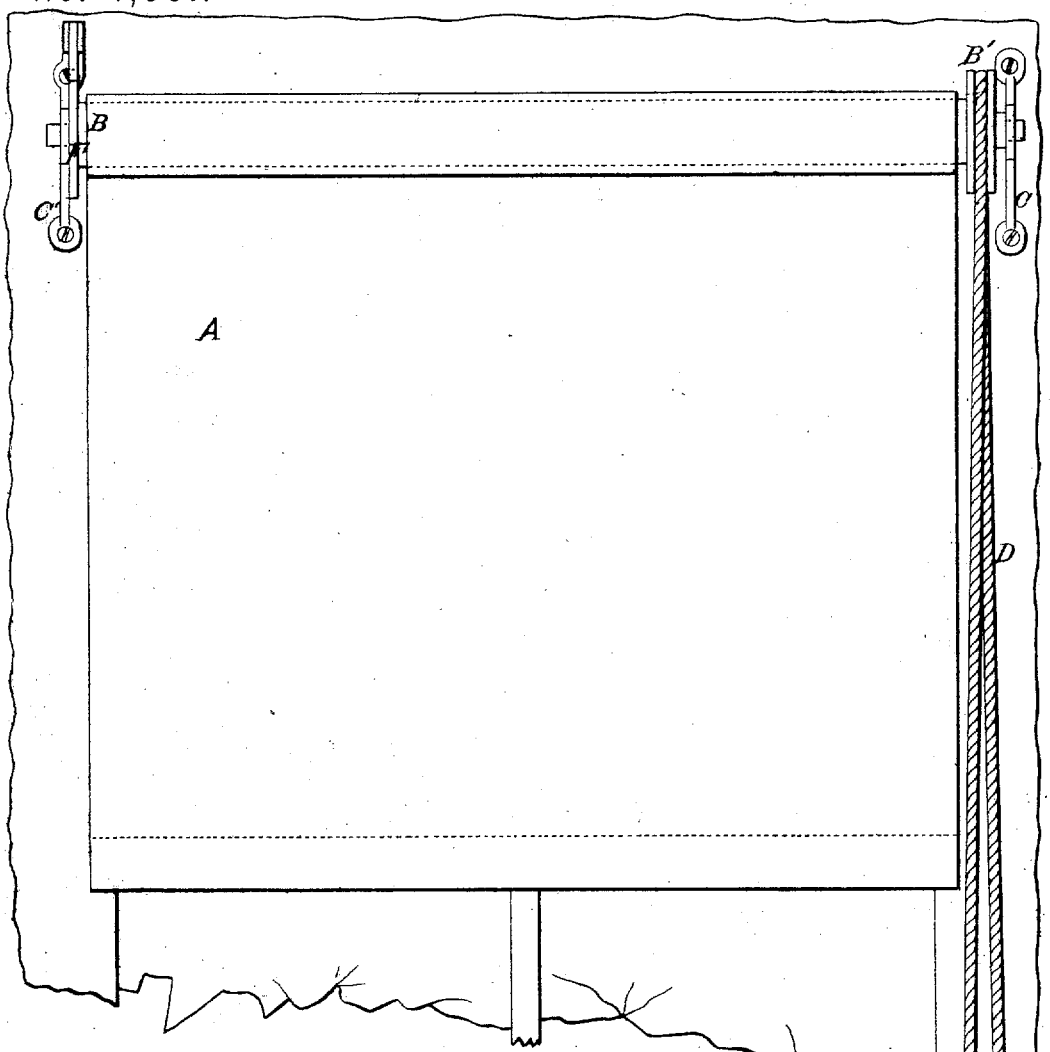
Figure 2:
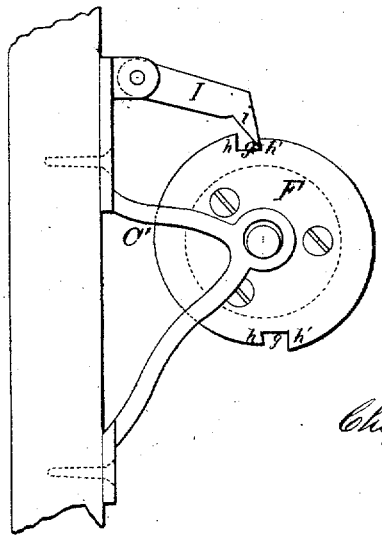

Figure 1 of the drawing is a representation of a front view of my invention, and Fig. 2 is an end view of the same.

This invention has relation to means for raising and lowering window-curtains with convenience; and it consists in the construction and arrangement of an automatic double-acting lock, placed at one end of a curtain-roller, having at the other end a pulley and endless cord, whereby the lock is operated in either direction at the same time that the curtain is shifted. By the manipulation of the endless cord the curtain may be locked at any height desired, and as readily loosened therefrom to be further elevated or lowered.

In the accompanying drawing, the letter A represents a window-curtain; B, the curtain-roller; and C C′, the brackets upon which this roller is supported. At one end of the curtain-roller is shown the pulley B′, over which passes an endless cord, D, provided with a suitable stay or fixture, E, near the lower end of the window. To the other end of the curtain-roller is secured a locking-wheel or disk, F, provided with one or more notches, *g*, in its periphery, which are adapted to engage with the obliquely-projecting finger *i* of a pawl or dog, I, pivoted to the bracket C′. The walls *h h′* of the notches *g* may be of unequal height, but this, although preferred, is not essential. Usually the outer wall of the notch is a little inclined inward for better security of engagement with the finger *i*.

In rolling up the curtain, by manipulating the cord the pawl will readily pass over the notches, but will enter and hold the curtain whenever the cord is released. To draw the curtain down, it is first raised sufficiently to lift the pawl, after which a quick pull on the curtain or cord will cause the roller to turn swiftly, and the finger of the pawl to ship the notches in the locking-wheel.

This invention is particularly applicable to the heavy shades which are used in store-windows, and which the ordinary tightened cord is insufficient to sustain.

What I claim as my invention, and desire to secure by Letters Patent, is—

The combination, with a curtain-roller, pulley, and endless cord, of the notched disk F and pawl I, substantially as specified.

In testimony that I claim the above I have hereunto subscribed my name in the presence of two witnesses.

HENRY H. PHILLIPS.

Witnesses:
D. D. KANE,
G. E. UPHAM.